RACK ASSEMBLY FOR SUPPORTING A PLURALITY OF ELECTRICAL UNITS

Filed Nov. 20, 1964 4 Sheets-Sheet 1

Feb. 28, 1967 D. A. CODY 3,307,080

RACK ASSEMBLY FOR SUPPORTING A PLURALITY OF ELECTRICAL UNITS

Filed Nov. 20, 1964 4 Sheets-Sheet 3

Feb. 28, 1967 D. A. CODY 3,307,080

RACK ASSEMBLY FOR SUPPORTING A PLURALITY OF ELECTRICAL UNITS

Filed Nov. 20, 1964

4 Sheets-Sheet 4

United States Patent Office 3,307,080

Patented Feb. 28, 1967

3,307,080

RACK ASSEMBLY FOR SUPPORTING A PLURALITY OF ELECTRICAL UNITS

Delbert A. Cody, 11140 Pinocchio St., Dallas, Tex. 75229

Filed Nov. 20, 1964, Ser. No. 412,793
3 Claims. (Cl. 317—101)

This invention relates to an improved communication equipment installation system and more particularly to such a system as it relates to multi-component aircraft radio equipment.

A primary object of this invention is to provide an installation system that concentrates the various individual unit components required in multi-engine aircraft in a central location in the aircraft.

Heretofore radio equipment consisting of an indicator panel and a plurality of functional components would be installed so that the indicator panel was near the operator's station and the functional components were at several different locations throughout the airframe. This practice necessitated the use of terminal boards to receive electrical cables from the several locations for combining and delivering the electrical leads to the indicator panel. This of course required that each individual cable be attached to the airframe at many locations along its path from the individual functional component location to the terminal board.

An essential portion of the system appertaining to the invention is a unique radio equipment installation rack assembly that provides an integral device suitable for physically supporting all of the functional component units required in an aircraft radio system and also providing a central electrical installation assembly whereby all of the electrical connections to the radio equipment functional components are provided in an easily-accessible unit.

It is, therefore, an important object of this invention to provide only a single cable throughout the entire aircraft to couple all of the functional component electrical signals to the indicator panel.

It is a further object to provide a novel radio equipment rack assembly that receives a plurality of functional component units in such a manner that they are guided into their proper physical location and electrical connection and are quick locked into place with extreme ease and without the use of tools of any kind.

And another object is to provide a complete electrical wiring gathering unit directly on the support rack whereby all of the electrical wiring for all of the functional components are accessible at one location in the aircraft for ease of installation and maintenance.

An additional object is to provide a housing for the electrical wiring gathering unit that includes a pivoted cover which contains the electrical connectors and plugs wherein the cover may be folded back to expose all of the wiring in the gathering unit.

Still an additional object of the invention is to provide an aircraft communication equipment rack for functional components including a base member and an electrical gathering unit, the base member further including a base plate and a plurality of guide rails, the gathering unit defined by a housing having a stationary portion and a pivoted cover, the stationary portion being rigidly attached to the base plate, a plurality of functional component electrical sockets on the stationary portion, the electrical sockets being positioned between cooperating pairs of rails, a plurality of electrical connector plugs on the pivoted cover, and a flexible wiring harness in the gathering unit between the sockets and plugs.

These and other objects and advantages will be apparent from an examination of the following specification and drawing in which.

Figure 1:
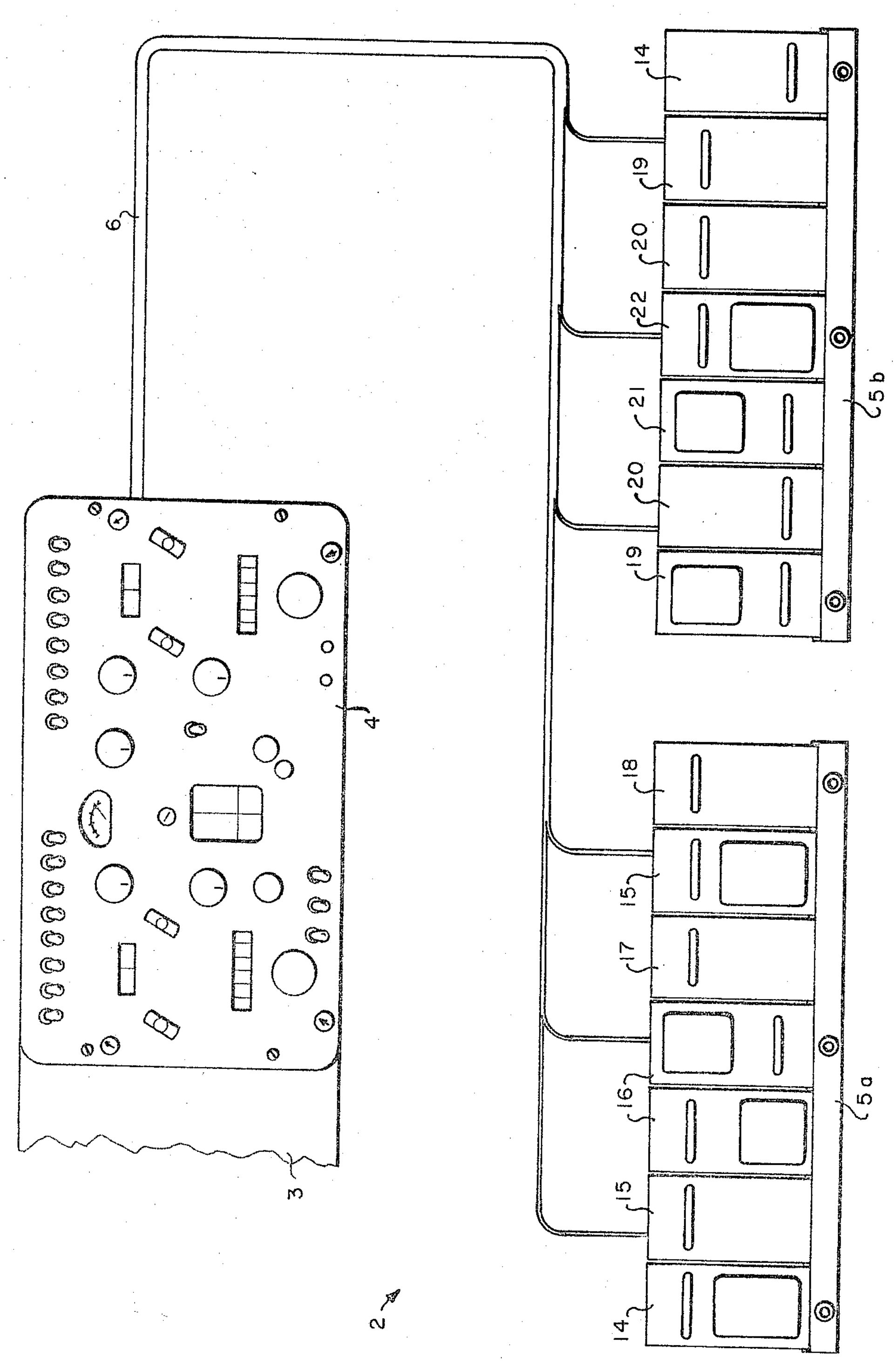
FIG. 1 is an outline view, partly in schematic, of the installation system detached from the aircraft.

Referring now more particularly to the reference characters in the accompanying drawings, it will be observed in FIG. 1 that the installation system of the invention, identified generally at 2, consists basically of a console supporting means 3 for mounting a conventional radio indicator panel 4 near the pilot or navigator of a multi-engine aircraft and a rack assembly 5 for mounting conventional functional components at a location remote from the pilot or navigator, and a single interconnecting cable assembly 6.

The radio indicator panel 4 may be any commercially available panel, and is installed on the airframe by means of a plurality of lock nuts 7 attached to the rear of the panel unit. The rear plate 8 of the panel unit as shown in FIG. 6 contains three multi-pin electrical plugs 9–11 to receive corresponding sockets on cable assembly 6.

The individual functional components that transmit signals to the indicator panel 4 are remotely located on rack assembly 5 and consist of remote magnetic indicators 14 (two units), communication receivers 15 (two units), communication transmitters 16 (two units), marker beacon receiver 17, speaker amplifier 18, navigation receivers 19 (two units), OMNI converters 20 (two units), glide slope receiver 21, and course director 22. Each of these functional components includes an electrical connector plug 25 to engage a corresponding electrical socket 26 on rack assembly 5. For ease of handling, the rack assembly 5 may be made in two parts as shown at *5a* and *5b*, but the concept of this installation system is a unitized remote installation for the functional components so that a single cable assembly will connect the remote units with the console unit.

Figure 2:
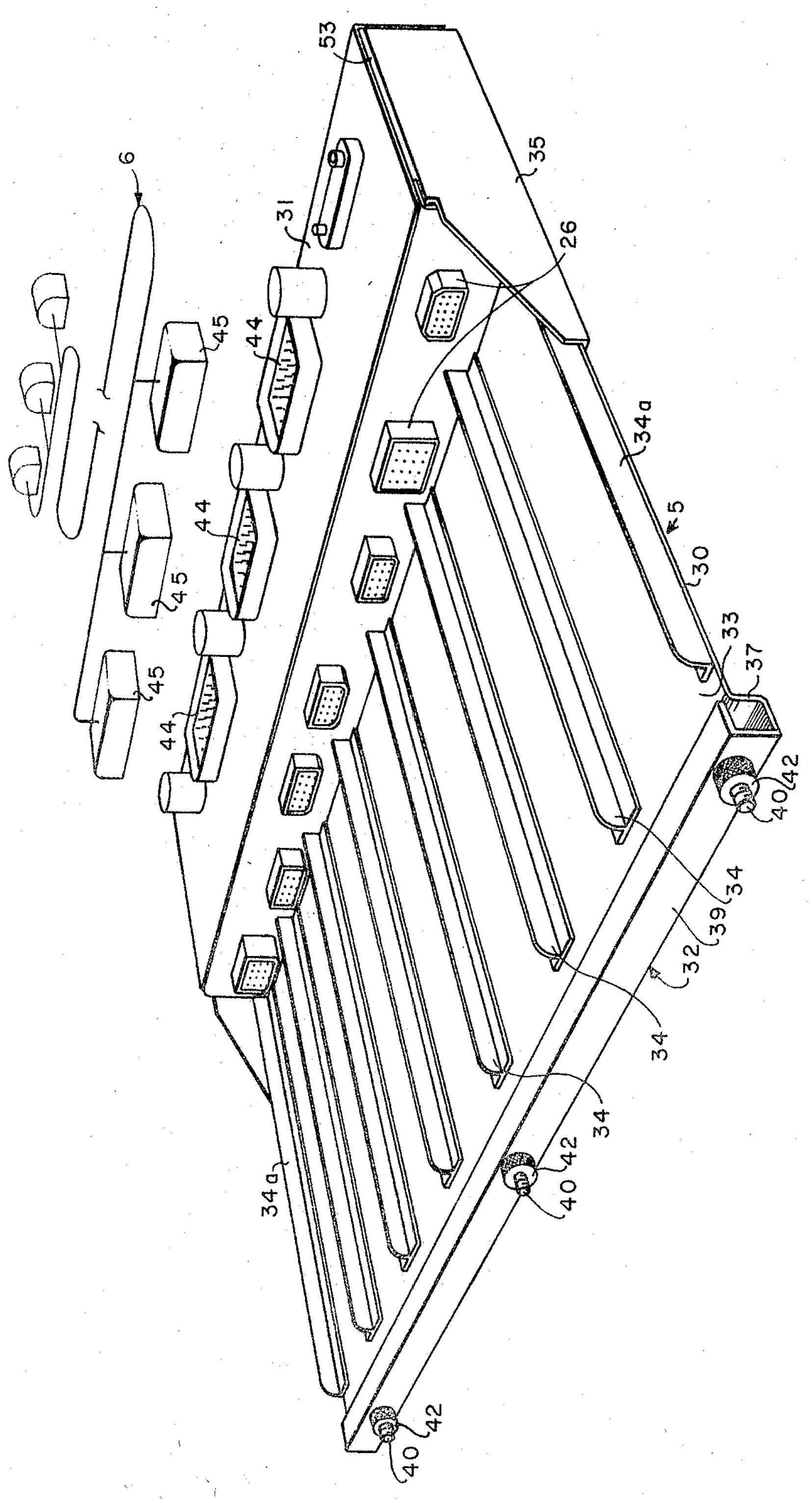
FIG. 2 is a perspective view of the rack assembly appertaining to this invention.
Figures 3, 6, 7:
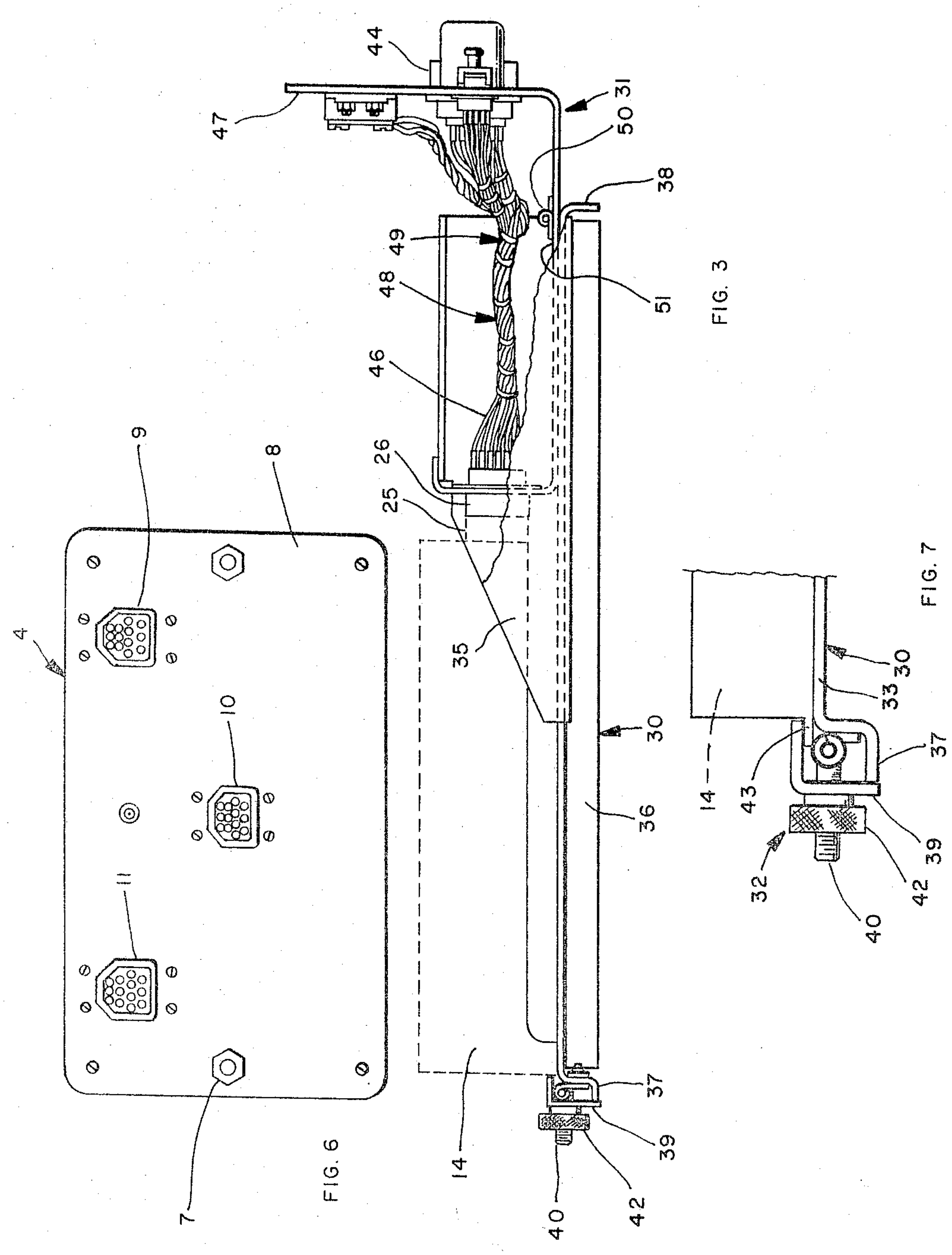
FIG. 3 is a side elevational view of the rack assembly of FIG. 2 with the wiring compartment cover in its fully open position.
FIG. 6 is a rear view of the indicator panel unit of FIG. 1.
FIG. 7 is an enlarged fragmentary detail view of the component locking arrangement of FIG. 3.
Figures 4, 5:
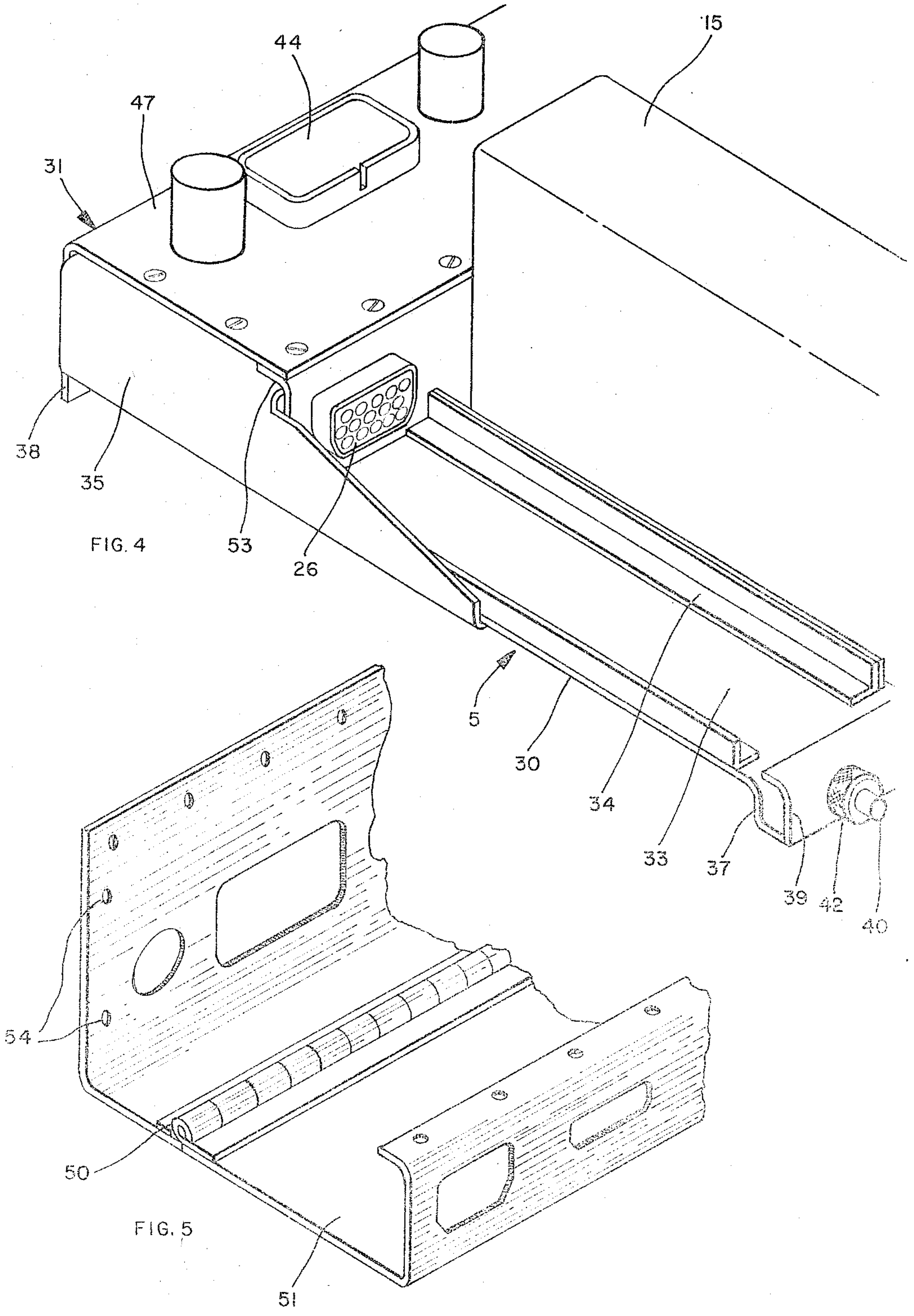
FIG. 4 is a partially broken away top perspective view of the rack assembly of FIG. 3 showing a typical component inserted in the rack.
FIG. 5 is a partially broken out detail perspective view of the wiring compartment for the electrical gathering unit frame.

In FIGS. 2–4 it will be observed that the composition of the radio equipment rack assembly 5 includes a base member 30 having an electrical wiring gathering unit 31 attached at its rearward end, and having a locking unit 32 attached at its forward end. The base member 30 includes a base plate 33 to which are attached a plurality of angle members placed back to back in pairs to form T-shaped rails 34, and to which base plate are attached a pair of trapezoid shaped brace members 35 in such a manner as to form end closures for the electrical wiring gathering unit 31. Angles **34*a* connect with units 33, 31 and 35 and serve to strengthen the plate 33 as well as guide the components into place. The base member may also include reinforcing channels 36 attached to its bottom side as shown in FIG. 3. Base member 30 will sometimes have vibration absorbing means (not shown) thereon to provide attachment between the rack assembly 5 and the aircraft. Base plate 33 may also include depending lips 37 and 38** for structural strength at its forward and rearward ends respectively. The forward depending lip 37 is L-shaped and serves an additional purpose by cooperating with a separate L-shaped locking member 39 to hold the components 14–22 in place on the rack assembly. A series of pivoted screws 40 are attached to the vertical portion of the forward lip 37 so that upon being passed through corresponding holes in locking member 39 a knurled nut 42 may be employed on screw 40 to bind locking member 39 to a corresponding lip 43 on the components 14–22. When the components 14–22 are guided into place on rack assembly 5 by their cooperating rail members 34 and/or angle members 34*a*, and the locking member 39 of locking unit 32 has been tightened into place, the plug 25 on each component 14–22 will be in firm electrical engagement with its corresponding electrical socket 26 of the electrical gathering unit 31. The seven electrical connector sockets 26 on each gathering unit 31 are in circuit connection with only three connector plugs 44 for connection to the corresponding connectors 45 on cable assembly 6. Thus, it is seen that the electrical gathering unit 31 has multiple input and multiple output connectional capability, and has a bundled flexible wiring harness between the input and output connector members. For clarity of description, the seven electrical sockets 26 each receive an electrical plug 25 from the aligned functional electrical component (14–22), and may be identified as "a first plurality of electrical component connector members"; and the three connector plugs 44 each are in circuit connection with the sockets 26 to transfer the electrical signals from a particular functional electrical component to an external circuitry, and may be identified as "a second plurality of electrical transfer connector members."

Internally of the gathering unit 31, the lead wires 46 from sockets 26 to plugs 44 are of such a length that the top cover 47 may be opened with ease and laid back to its fully opened position without putting any strain on any of the lead wires. The individual lead wires 46 are assembled and combined inside unit 31 in such a manner as to form an electrical harness 48 having the bulk concentration of the separate lead wires in a horizontally positioned bundle 49 located very near and parallel to the hinge member 50 between the stationary frame 51 and the pivoted cover 47 of the gathering unit 31. This arrangement greatly facilitates the initial installation and maintenance of the electrical circuitry in this rack assembly. And of course the full opening cover to which one-half of the connections are made permits free access to all of the circuit elements and circuit connections of the rack assembly gathering unit 31.

In the structural assembly of the rack members, the brace members 35 uniquely serve the two functions of reinforcing the physical attachment of the base member 30 to the gathering unit 31, and closing the open ends of the gathering unit. The brace members 35 are each formed with an inwardly facing upper lip 53 having two screw holes so that the cover 47 may be attached by means of its corresponding screw holes 54 when it snugly engages the lip 53 at its closed position.

The cables including each of the sockets 45 are combined into one cable assembly 6 near the rack assembly 5, so that only one attaching unit is needed per attaching station and consequently only one cable path need be traced to locate trouble. The advantages of such an installation system will be apparent from an examination of the comparison between the instant invention and conventional systems wherein components may be located at various locations in the aircraft and which are connected to the indicator panel by many cable assemblies.

From the foregoing description it will be readily seen that there has been produced a device which substantially fulfills the objects of this invention as set forth herein. The invention is not limited to the exemplary construction herein shown and described, but may be made in many ways within the scope of the appended claims.

What is claimed is:

1. An aircraft communication equipment rack assembly for supporting a plurality of electrical functional components having output plugs comprising: a base member and a connectional, electrical gathering unit, said base member including a base plate and a plurality of guide rails, said gathering unit comprising a housing having a stationary portion and a pivoted cover, said stationary portion being rigidly attached to said base plate, a plurality of electrical component connector members on said stationary portion, said component connector members positioned between cooperating pairs of rails, a plurality of electrical transfer connector members on said pivoted cover, and a flexible wiring harness in said gathering unit electrically interconnecting said component connector members and said transfer connector members.

2. An aircraft communication equipment rack assembly for supporting a plurality of electrical functional components having outlet plugs, comprising: a base member and a connectional electrical gathering unit, said base member including a base plate and a plurality of guide rails, said gathering unit comprising a housing having a generally L-shaped stationary frame and a generally L-shaped cover pivoted thereto, brace members attaching one end of said frame to said base plate, the other end of said base plate including an L-shaped depending lip, and an L-shaped locking rail cooperating with said L-shaped depending lip for holding the components on the base member when the component plugs and the gathering unit sockets are engaged.

3. An aircraft communication equipment rack assembly for supporting a plurality of electrical functional components having connector plugs, comprising the separate structural pieces of a base plate, a connectional electrical gathering unit attached to the base and having a frame including a generally L-shaped stationary frame and a generally L-shaped cover pivoted thereto, a pair of generally trapezoidally shaped brace members attached to said stationary frame and to said base plate and closing the ends of said electrical gathering unit, electrical connector openings in both the stationary and pivoted portions of the gathering unit frame, and locking means attached on said base plate to releasably retain components placed thereon.

References Cited by the Examiner

UNITED STATES PATENTS

| | | | |
|---|---|---|---|
| 2,609,268 | 9/1952 | Nye | 317—101 X |
| 2,778,004 | 1/1957 | Lear et al. | 340—27 |
| 2,808,575 | 10/1957 | Karlson | 317—101 X |
| 3,014,160 | 12/1961 | Brogden | 317—101 |

ROBERT K. SCHAEFER, *Primary Examiner.*

W. C. GARVERT, *Examiner.*